(12) United States Patent
Dressler

(10) Patent No.: US 9,724,973 B2
(45) Date of Patent: Aug. 8, 2017

(54) MACHINE FOR FITTING/REMOVING A TYRE

(71) Applicant: SICAM S.r.l., Correggio (IT)

(72) Inventor: Bjoern Dressler, Iphofen (DE)

(73) Assignee: SICAM S.R.L., Correggio (RE) (IT)

( * ) Notice: Subject to any disclaimer, the term of this patent is extended or adjusted under 35 U.S.C. 154(b) by 322 days.

(21) Appl. No.: 14/667,264

(22) Filed: Mar. 24, 2015

(65) Prior Publication Data

US 2015/0273960 A1  Oct. 1, 2015

(30) Foreign Application Priority Data

Mar. 25, 2014  (IT) .............................. MO2014A0075

(51) Int. Cl.
*B60C 25/05*  (2006.01)
*B60C 25/138*  (2006.01)
*B60C 25/13*  (2006.01)

(52) U.S. Cl.
CPC .......... *B60C 25/0521* (2013.01); *B60C 25/13* (2013.01); *B60C 25/138* (2013.01)

(58) Field of Classification Search
CPC .... B60C 25/0521; B60C 25/13; B60C 25/138
See application file for complete search history.

(56) References Cited

U.S. PATENT DOCUMENTS 6,182,736 B1 * 2/2001 Cunningham ........ B60C 25/135
157/1.17
6,289,962 B1 * 9/2001 Klein ...................... B60C 25/13
157/1.17
6,854,950 B2 * 2/2005 Corghi .................... B60C 25/05
414/680
7,343,955 B2 * 3/2008 Cunningham ........ B60C 25/135
157/1.17
7,591,295 B2 * 9/2009 Bonacini ................ B60C 25/13
157/1.17
7,828,035 B2 * 11/2010 Bonacini ............. B60C 25/0521
157/1.24

(Continued)

FOREIGN PATENT DOCUMENTS

EP        2 514 613 A1    10/2012

OTHER PUBLICATIONS

Italian Search Report, dated Nov. 11, 2014, corresponding from IT application.

*Primary Examiner* — David B Thomas
(74) *Attorney, Agent, or Firm* — Young & Thompson

(57) ABSTRACT

The machine (10) for fitting/removing a tyre includes:
a bedplate (12) for resting on the ground;
a spindle (16), mounted on the bedplate and configured to tighten a rim of a wheel thereon;
a demounting tool, mounted on the bedplate and able to remove a tyre from the rim when the wheel is loaded on the spindle;
a bead breaking arm (30), movably connected to the bedplate and having a bead breaking tool (32) able to bead break the tyre from the rim;
a lifting member (52, 54, 56), movably connected to the bedplate and able to lift the wheel to load it on the spindle after bead breaking; and
an operating device (40) which is selectively connectable either to the bead breaking arm or to the lifting member and able to operate the bead breaking arm or the lifting member according to choice.

10 Claims, 2 Drawing Sheets

(56) References Cited

U.S. PATENT DOCUMENTS

| | | | | |
|---|---|---|---|---|
| 7,882,882 B2* | 2/2011 | Cunningham | ........ | B60C 25/135 |
| | | | | 157/1.17 |
| 8,826,962 B2* | 9/2014 | Bonacini | ................. | B60C 25/13 |
| | | | | 157/1.17 |
| 9,114,675 B2* | 8/2015 | Bonacini | ................. | B60C 25/13 |
| | | | | 157/1.17 |
| 9,150,059 B2* | 10/2015 | Gallup | .................... | B60C 25/13 |
| | | | | 157/1.28 |
| 9,162,544 B2* | 10/2015 | Davis | ...................... | B60C 25/13 |
| | | | | 157/1.17 |
| 2011/0042875 A1 | 2/2011 | Story | | |
| 2012/0222823 A1* | 9/2012 | Mimura | ................ | B60C 25/138 |
| | | | | 157/1.17 |
| 2013/0240154 A1* | 9/2013 | Gallup | .................... | B60C 25/13 |
| | | | | 157/1.26 |
| 2015/0224834 A1* | 8/2015 | Macchia | ............. | B60C 25/0527 |
| | | | | 157/1.24 |

* cited by examiner

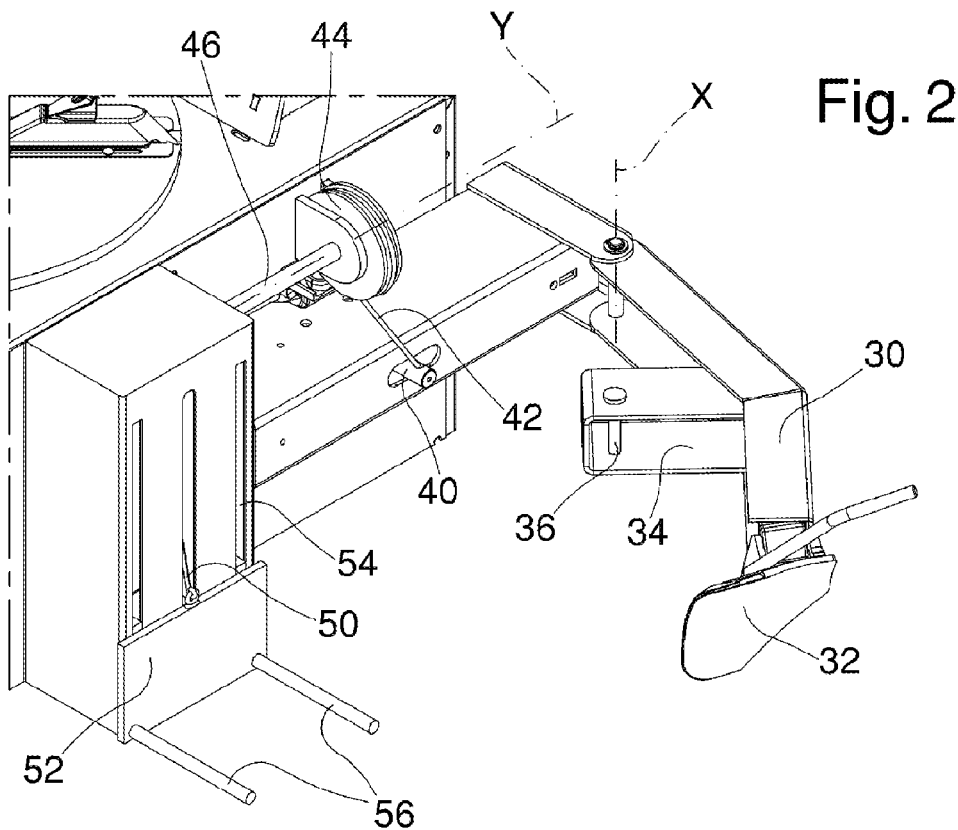
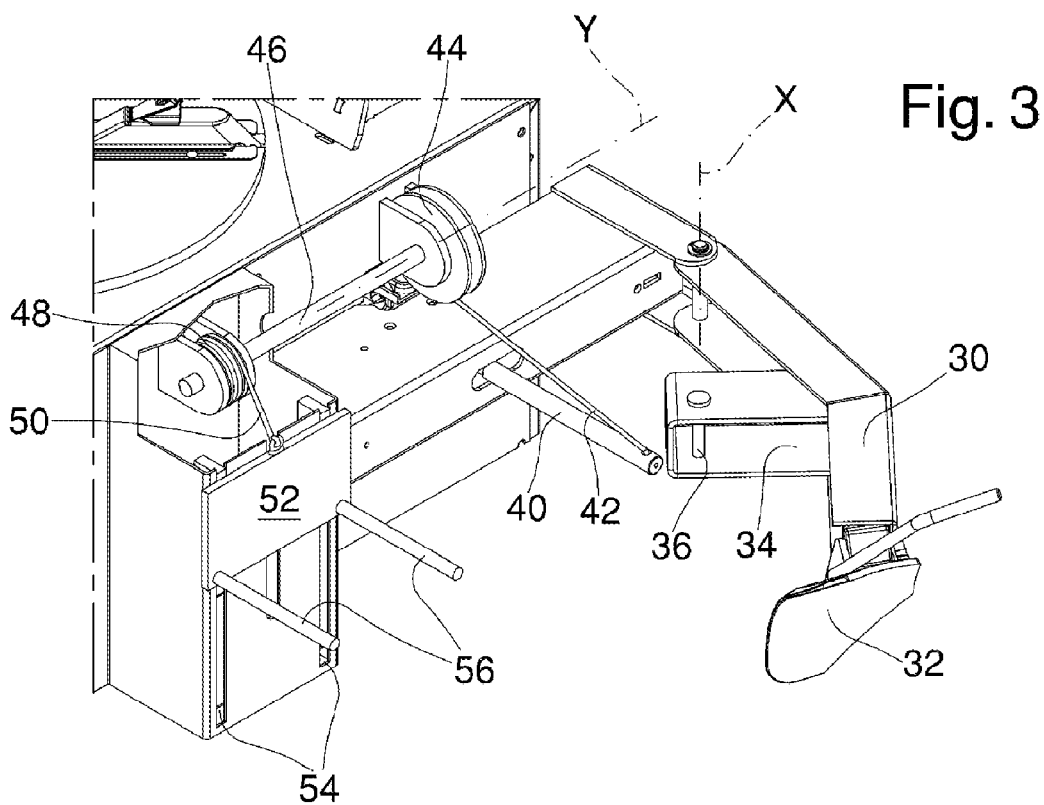

MACHINE FOR FITTING/REMOVING A TYRE

FIELD OF THE INVENTION

The present invention relates to a machine for fitting/removing a tyre.

The wheels for vehicles consist of a metal rim having, at its axial extremities, annular containment flanges between which a groove is defined for inserting a tyre by interlocking.

BACKGROUND OF THE INVENTION

In the mounting configuration, the lateral portions of the tyre, called "beads", abut against the containment flanges.

An air chamber can be inserted in the tyre or, in case of "tubeless" tyres, pressurized air can be introduced directly.

Tyre-changing machines are currently employed to perform the fitting and removal operations of tyres onto and from the relative rims.

They allow to remove the tyre from its rim, after bead breaking, e.g. to perform maintenance or replacement jobs on the air chamber, the rim and/or the tyre itself, and then to mount it again, or place a new one.

Tyre-changing machines have a tool to pull the tyre off the rim, and one to break the beads of the tyre before removing.

Traditional tyre-changing machines, moreover, are more and more often equipped with a wheel lifting device which allows to lift the wheel after the bead breaking stage and to load it on a centering device the machine is provided with.

This aims at reducing the operator's physical effort and increasing the ergonomics of everyday work and hourly efficiency.

The lifting device is used, even after fitting, in order to release the wheel from the tyre-changing machine At present there are different types of side lifting device applied on tyre-changing machines The device is essentially positioned on one side of the machine and is driven independently by a pneumatic cylinder connected to the lifter's frame.

These solutions have several drawbacks including the fact that:
- the device is operated using one or two pneumatic cylinders activated by a pneumatic pedal. This construction is expensive and complicated;
- the operator activates the pedal uncomfortably and employing a long time, since he/she has to change his/her position after bead breaking and/or after the fitting/removal operation is completed;
- the operator must manually move the wheel to put it on the lifting device.

SUMMARY OF THE INVENTION

The main aim of the present invention is to provide a machine for fitting/removing a tyre with improved functions.

Another object of the present invention is to provide a tyre-changing machine with a more intuitive operation as regards its wheel lifting device.

Another object of the present invention is to provide a tyre-changing machine that requires fewer operations to be made by the operator.

Another object of the present invention is to provide a tyre-changing machine with a reduced number of pneumatic cylinders, in order to lower its cost.

The above mentioned objects are achieved by a machine for fitting/removing a tyre having the characteristics mentioned in claim 1.

Other characteristics and advantages of the present invention will become better evident from the description of a preferred, but not exclusive embodiment of a machine for fitting/removing a tyre, illustrated by way of an indicative, but not limitative, example in the accompanying drawings wherein:

BRIEF DESCRIPTION OF THE DRAWINGS

FIG. 2 is a view of a detail of the machine according to the invention in a first configuration;

FIG. 3 is a view of a detail of the machine according to the invention in a second configuration and with some parts in transparency.

DETAILED DESCRIPTION OF THE INVENTION

Figure 1:
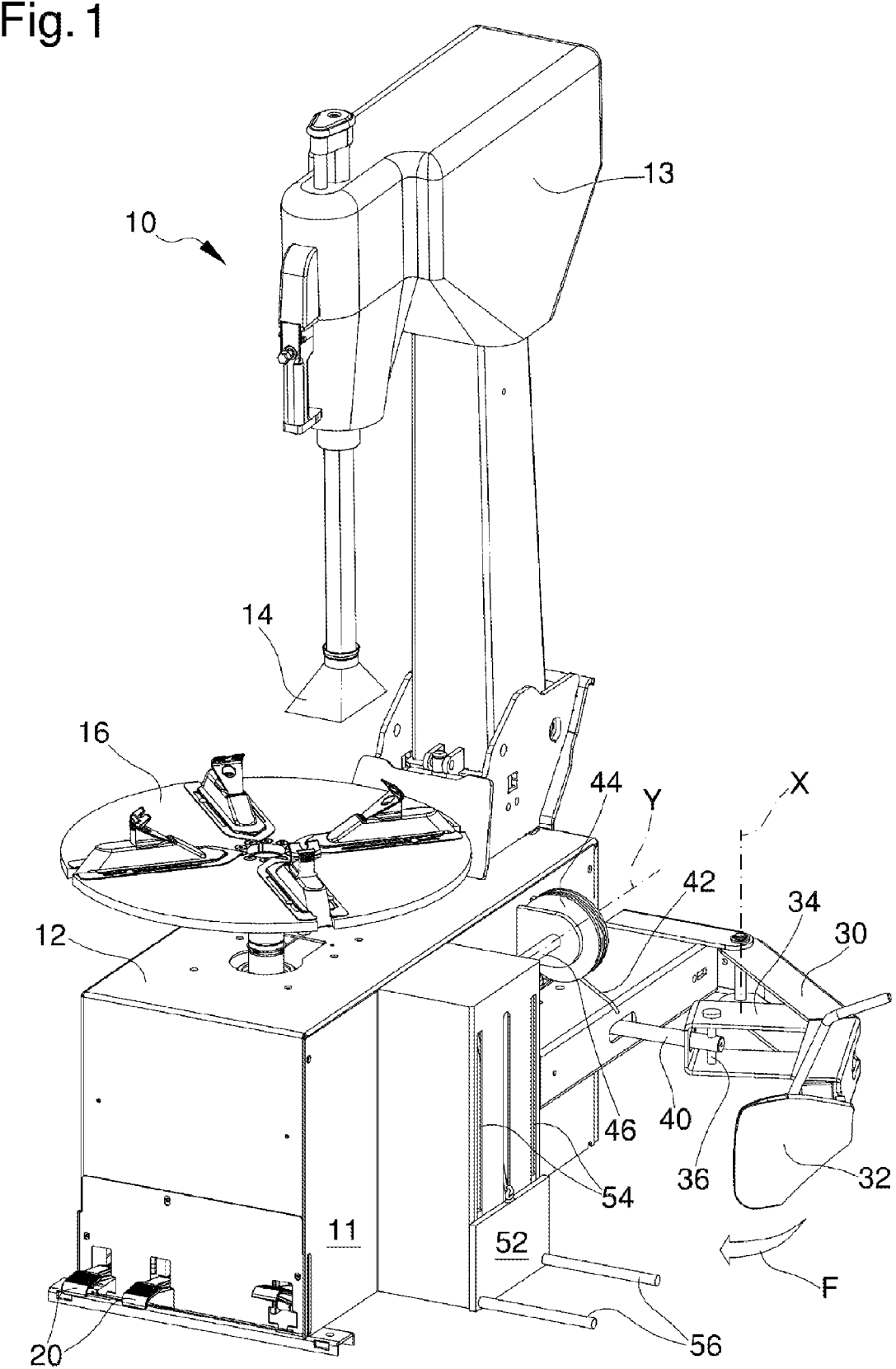
FIG. 1 is an axonometric view of the machine according to the invention.

With particular reference to such figures, the reference numeral 10 globally indicates a machine for fitting/removing a tyre.

The machine 10 comprises a bedplate 12 for resting on the ground, on which is mounted a spindle 16 configured to tighten the rim of a wheel on it, e.g. by means of the cooperation with a hub or known locking clamps.

On the bedplate 12 is mounted an upright 13 that carries a demounting tool 14 which is able to remove the tyre from the rim when the wheel is loaded on the spindle 16.

To the bedplate 12 is also movably connected a bead breaking arm 30 with a known "blade" or bead breaking tool 32.

The bead breaking arm 30, in particular, is hinged to the bedplate 12 around a pivoting axis X substantially vertical.

By rotating around the pivoting axis X, the bead breaking arm 30 can be approached to the bedplate 12 by horizontally displacing the bead breaking tool 32 (arrow F) to break the beads of the tyre from the rim as a preliminary operation to removal.

To the bedplate 12 is also movably connected at least a lifting member 52, 54, 56 able to lift the wheel to load it on the spindle 16 after bead breaking.

In particular, the lifting member 52, 54, 56 comprises a carriage 52 movable vertically and guided by linear guides 54, which is equipped with a loading area 56, the type of a fork, a platform or other, on which the wheel can be placed to lift it when the carriage 52 slides along the linear guides 54.

Both the bead breaking arm 30 and the lifting member 52, 54, 56 are positioned adjacent on a same lateral side 11 of the bedplate 12.

According to the invention, the machine 10 comprises an operating device 40, e.g in the form of a piston movable linearly, which is selectively connectable either to the bead breaking arm 30, to make it move and break the beads of the tyre, or to the lifting member 52, 54, 56, to make it move and lift the wheel.

This way the operating device 40 is able to operate the bead breaking arm 30 and the lifting member 52, 54, 56 according to choice.

For this purpose, the machine 10 comprises non-permanent coupling means 36, 42 able to connect kinematically the operating device 40 alternatively either to the bead breaking arm 30 or to the lifting member 52, 54, 56.

In the particular embodiment shown in the illustrations, the non-permanent coupling means 36, 42 are of the manually operable type, but alternative embodiments cannot be ruled out in which the machine 10 comprises an automatic control device, of the mechanical, electronic, pneumatic type or the like, which is able to control the coupling state of the non-permanent coupling means 36, 42.

More in detail, on the bead breaking arm 30 is mounted at least a displaceable element 36 able to selectively hinge the movable piston 40 in at least one point of the bead breaking arm 30.

The displaceable element 36 consists e.g. of a pin 36 integral with a bracket 34 present on the bead breaking arm 30 (FIG. 1).

The pin 36 is removable from the bracket 34, so that it is enough to pull it out to release the bead breaking arm 30 from the movable piston 40.

When the displaceable element 36 is pulled out, the movable piston 40 can be connected to the lifting member 52, 54, 56.

For this purpose at least a first flexible element 42 is provided that can be selectively connected to the movable piston 40, the first flexible element 42 being able to transfer motion to the lifting member 52, 54, 56.

In particular, the first flexible element 42 is wound on at least a rotating element 44, 46, 48 on which is also wound at least a second flexible element 50 in turn connected to the lifting member 52, 54, 56, the flexible elements 42, 50 being wound on the rotating element 44, 46, 48 so that one winds when the other unwinds.

The rotating element 44, 46, 48 is associated with the bedplate 12 in a rotatable manner around a substantially horizontal axis of rotation Y.

The rotating element 44, 46, 48, e.g., comprises a first pulley 44, on which is wound the first flexible element 42, and a second pulley 48, on which is wound the second flexible element 50, the pulleys 44, 48 being connected by a revolving shaft 46 substantially coaxial to the axis of rotation Y.

The movable piston 40 is selectively connectable to the first flexible element 42, the type of a first cable or the like, which is wound around the first pulley 44.

The free extremity of the first cable 42, in fact, is connectable to the free extremity of the movable piston 40, e.g. by means of the interlocking of a knot inside a groove (FIG. 2).

The carriage 52 is instead stably linked to the second flexible element 50, the type of a second cable or the like, which is wound around the second pulley 48. Pedals 20 control the bidirectional movement (forward-backward) of the movable piston 40.

The operation of machine 10 according to the present invention is as follows. The tyre is first of all positioned above the loading area 56, lowered to the ground as in FIG. 1.

The movable piston 40 is coupled to the bead breaking arm 30 with the pin 36, e.g. manually or by means of the automatic-controlled mechanical device (not shown).

By means of the pedals 20 is operated the movable piston 40 to pull the bead breaking arm 30 towards the bedplate 12 (FIG. 1, arrow F), so as to break the bead of a portion of the tyre.

The movable piston 40 is then operated in the opposite direction to move the bead breaking arm 30 away from the bedplate 12 and make the tyre accessible to the operator, who repositions it by turning it on itself so as to break the bead of another portion of the tyre.

Once the tyre has undergone bead breaking completely, the movable piston 40 is released from the bead breaking arm 30, retracted towards the bedplate 12 and connected to the first cable 42 (FIG. 2).

By means of the pedals 20 is controlled the extension of the movable piston 40, which pulls the first cable 42.

The first pulley 44 (FIG. 3) is dragged in rotation by the first cable 42 and, through the shaft 46, it transfers the rotary motion to the second pulley 48.

Through the second cable 50, the second pulley 48 drives the carriage 52 up and, consequently, the wheel arranged on the loading area 56 is lifted and approaches the spindle 16.

The operator can then mount the wheel on the spindle 16, taking it from a convenient position and without moving, the control by means of pedals 20 being enough.

It can be understood therefore that the machine 10 has many advantages, including:

- only one operating device (here the movable piston 40) is exploited to selectively move both the bead breaking arm 30 and the lifting member 52, 54, 56 for the wheel, saving components and reducing the complexity and cost of the machine 10;
- the operating device is connectable either to the bead breaking arm 30 or to the lifting member 52, 54, 56 with easy maneuvers, depending on which of the two has to be activated;
- the bead breaking arm 30 and the lifting member 52, 54, 56 are adjacent, therefore the operator carries out bead breaking and then, without moving the wheel much or not at all, the same can be loaded on the spindle 16. This improves the functionality of the machine 10, reduces fatigue and the number of actions carried out by the operator, increasing the overall output;
- the machine 10 is controllable by the operator without complicated or laborious movements, e.g. with pedals 20.

The machine of the invention is open to many variants.

For example as non-permanent coupling means able to connect kinematically the operating device 40 alternatively either to the bead breaking arm 30 or to the lifting member 52, 54, 56 chains may be used, and not cables, engaging on gear wheels, and not on pulleys.

In place of a rotating element such as the shaft 46, on which are wound the flexible elements such as the cables 42, 50, one can use e.g. a linear kinematic chain, with hinged rigid segments (such as, e.g. a pantograph) or a gear mechanism.

The invention claimed is:

1. Machine (10) for fitting/removing a tyre, comprising:
   at least a bedplate (12) for resting on the ground;
   at least a spindle (16), mounted on said bedplate (12) and configured to tighten a rim of a wheel on it;
   at least a demounting tool (14), mounted on said bedplate (12) and able to remove a tyre from said rim when said wheel is loaded on said spindle (16);
   at least a bead breaking arm (30), movably connected to said bedplate (12) and having a bead breaking tool (32) able to bead break said tyre from said rim;
   at least a lifting member (52, 54, 56), movably connected to said bedplate (12) and able to lift said wheel to load it on said spindle (16) after bead breaking;
   wherein said machine (10) comprises at least an operating device (40) which is selectively connectable either to said bead breaking arm (30) or to said lifting member (52, 54, 56)

and able to operate said bead breaking arm (30) or said lifting member (52, 54, 56) according to choice.

2. Machine (10) according to claim 1, wherein said machine (10) comprises non-permanent coupling means (36, 42) able to connect kinematically said operating device (40) alternatively either to said bead breaking arm (30) or to said lifting member (52, 54, 56).

3. Machine (10) according to claim 2, wherein said non-permanent coupling means (36, 42) are of the manually operable type.

4. Machine (10) according to claim 2, wherein said machine (10) comprises an automatic control device able to control the coupling state of said non-permanent coupling means (36, 42).

5. Machine (10) according to claim 2, wherein said operating device (40) comprises a movable piston.

6. Machine (10) according to claim 5, wherein on said bead breaking arm (30) is mounted at least a displaceable element (36) able to selectively hinge said movable piston (40) in at least one point of said bead breaking arm (30).

7. Machine (10) according to claim 5, wherein said machine (10) comprises at least a first flexible element (42) selectively connectable to said movable piston (40), said first flexible element (42) being able to transfer motion to said lifting member (52, 54, 56).

8. Machine (10) according to claim 7, wherein said first flexible element (42) is wound on at least a rotating element (44, 46, 48) on which is wound at least a second flexible element (50) in turn connected to said lifting member (52, 54, 56), said flexible elements (42, 50) being wound on said rotating element (44, 46, 48) so that one winds when the other unwinds.

9. Machine (10) according to claim 8, wherein said flexible elements (42, 50) comprise two cables wound on pulleys (44, 48) connected by a shaft (46).

10. Machine (10) according to claim 1, wherein said bead breaking arm (30) and said lifting member (52, 54, 56) are positioned adjacent on a same lateral side (11) of said bedplate (12).

* * * * *